United States Patent
Sanchez et al.

(10) Patent No.: US 9,213,733 B2
(45) Date of Patent: Dec. 15, 2015

(54) COMPUTERIZED INTERNET SEARCH SYSTEM AND METHOD

(71) Applicant: Ttwick, Inc., New York, NY (US)

(72) Inventors: Luis Sanchez, New York, NY (US); Ralf Voellmer, New York, NY (US)

( * ) Notice: Subject to any disclaimer, the term of this patent is extended or adjusted under 35 U.S.C. 154(b) by 0 days.

(21) Appl. No.: 14/681,409

(22) Filed: Apr. 8, 2015

(65) Prior Publication Data

US 2015/0261806 A1  Sep. 17, 2015

Related U.S. Application Data

(63) Continuation of application No. 13/848,820, filed on Mar. 22, 2013.

(60) Provisional application No. 61/614,163, filed on Mar. 22, 2012.

(51) Int. Cl.
*G06F 17/30* (2006.01)
*G06Q 30/02* (2012.01)

(52) U.S. Cl.
CPC ...... *G06F 17/30353* (2013.01); *G06F 17/3087* (2013.01); *G06F 17/30864* (2013.01); *G06Q 30/0226* (2013.01)

(58) Field of Classification Search
CPC ................ G06F 17/30867; G06F 17/30864; G06F 17/3071
USPC .............. 707/706, 708, 722, 723, 737, 748
See application file for complete search history.

(56) References Cited

U.S. PATENT DOCUMENTS

| | | | |
|---|---|---|---|
| 8,131,779 B2 * | 3/2012 | Jonker | G06F 17/30017 707/811 |
| 2005/0192958 A1 * | 9/2005 | Widjojo | G06Q 10/02 |
| 2009/0005040 A1 * | 1/2009 | Bourne | H04L 12/588 455/435.1 |
| 2012/0036454 A1 * | 2/2012 | Cole | G06Q 10/103 715/752 |
| 2013/0081056 A1 * | 3/2013 | Hu | G06F 17/30705 719/313 |
| 2013/0124653 A1 * | 5/2013 | Vick | H04L 51/32 709/206 |

* cited by examiner

*Primary Examiner* — Md. I Uddin
(74) *Attorney, Agent, or Firm* — Honigman Miller Schwartz and Cohn LLP; James F. Kamp

(57) ABSTRACT

The present invention provides a system and method that can search social media and Internet websites, and can analyze and display the results according to a variety of criteria including virality on social media websites. The results are presented in a user friendly format such as a magazine, newsletter, newspaper, or scrapbook.

35 Claims, 23 Drawing Sheets

COMPUTERIZED INTERNET SEARCH SYSTEM AND METHOD

CROSS-REFERENCE TO RELATED APPLICATION

This application is a continuation of U.S. Ser. No. 13/848,820, filed Mar. 22, 2013, which claims priority based upon U.S. Provisional Patent Application Ser. No. 61/614,163, filed on Mar. 22, 2012. The entire contents of these applications are hereby incorporated by reference herein.

FIELD OF THE INVENTION

This invention relates to Internet search systems or engines, and more particularly to Internet search engines that search social media as well as news websites, e-commerce, websites, blogs, and blogging websites information to create and present search results.

BACKGROUND OF THE INVENTION

The Internet provides almost unlimited information to computer, tablet, and phone users having access thereto, but one needs an efficient search tool to retrieve, organize, and present the retrieved information in a form that is useful to the searcher. Various search engines have been created using different approaches and algorithms to obtain and organize data, as well as to present advertisements related to the subject of the search. Thus, an entire industry has grown up around these various search engines.

One of the earliest successful search engines was Netscape, which would scour the Internet for items of interest using key words. Netscape included algorithms to rank and display the results according to their relatedness to the search term.

Google, Inc. later produced another more successful search engine. As with Netscape, Google would search for key words using algorithms that would help to retrieve and rank the results of a search based upon a keyword or phrase entered into the search window. Google uses algorithms that rank the results in various ways, including according to the number of times the key words appear in the item or website retrieved, including in the metadata and links to and from other websites. This makes Google susceptible of manipulation by those who are knowledgeable about the algorithms used by Google to rank and display information retrieved in a search. Further, Google introduced the ability to display ads alongside or above search results by advertisers who paid for such display by purchasing Google "ad words," so that every time a search term is entered by a user, the advertisement or announcement would appear alongside or above the search results, and the advertiser's account would be charged accordingly for the advertisement. The price of ad words fluctuates according to their popularity, so that a very popular search term (meaning a frequently used search term) would cost considerably more than a less popular or frequently used search term. Google has developed algorithms to price ad words based on popularity.

Facebook has launched the well-known social media website, where a user can create a Facebook page that includes photos, comments, links, and the like posted on the subscriber's individual site. The website gives subscribers the opportunity to connect with other subscribers, by connecting with or "friending" them, allowing them to send messages, post messages, photos, or the like on one another's Facebook page. Facebook has also announced that it will be launching a search engine using Facebook, but its exact mechanism of operation and differences from the existing search engines remains unclear.

In addition, Google has launched a social media site, similar in some ways to Facebook, discussed below, but it is unclear at this juncture how widely used that site is, or whether and how it ties into the basic Google search engine, and how Google offers this site to its advertisers. Google is mainly based on the page, in that the search results it displays are pages from other sites, such as an article from a newspaper or an entry on Wikipedia, the well-known online encyclopedia whose entries are donated by users.

Twitter presents another recent social media mode of communication over the Internet, which allows users and subscribers to "tweet" messages to "followers" who have signed up to receive the messages tweeted by a particular individual. These messages may range from a few words to links to rather lengthy "blogs" or comments about a particular event or item of interest to the "tweeter" or the "follower." These messages for the most part do not seem to be retrieved by existing search engines, even though they have become frequently used by many individuals including celebrities, actors, politicians, newscasters, reporters, and others. Twitter also gets used by various businesses to make product announcements and special offers to customers who have signed up to receive such information.

There remains a need for a search engine that can search more traditional items such as newspapers, magazines, and Internet websites, as well as social websites and tweets, comments, and other user generated messages, and organize them in a way that presents the information so retrieved or located in an easy to use, organized, and user friendly fashion. There also remains a need for a search engine that can analyze and measure response instantaneously, and give reports on activity relating to a particular item or person of interest, including social demographics and other distinguishable characteristics. Such information would allow sponsors to follow particular groups and would also allow advertisers to pick particular topics or search results to advertise alongside. Further, such information would allow pollsters and other types of analysts to measure public reaction to events of political importance.

SUMMARY OF THE INVENTION

The foregoing objects are achieved and the disadvantages of earlier or other systems are overcome by the present invention, which provides a search engine and system comprising: non-transitory computer-readable storage medium storing instructions executable by a computer system, the non-transitory computer-readable storage medium comprising instructions to: a computer system: receive specified search topic from a user's computing device such as a laptop, personal computer, tablet, cellular telephone, smart phone and the like; for the specified search topic, search one or more social media networks, news or other websites, blogs or blogging websites and/or e-commerce sites to identify messages posted to the one or more social media or other websites related to the specified topic; receive a selection of one or more attributes potentially associated with each of the identified messages from the remote computer; classify each of the identified messages according to the one or more selected attributes; generate a visual representation indicating a quantity of the identified messages classified according to the one or more selected attributes; and cause the visual representation to be provided to the remote computer.

BRIEF DESCRIPTION OF THE DRAWINGS

Further objects, features, and advantages of the invention will become apparent to those of ordinary skill in the art upon reviewing the following detailed description of the preferred embodiments taken in connection with the following drawings in which.

DETAILED DESCRIPTION OF THE PREFERRED EMBODIMENTS

As used herein, "Content Rank" refers to the weighted average affection score. It normalizes positive sentiment towards any topic (person, place, event, or thing) so that it can be compared and ranked against any other topic, even if of a different type. The evolution of a topic's Content Rank can be tracked over time. The algorithm to accomplish this involves collecting and noting the number of pieces of content returned from a search on a particular topic; determining whether the sentiment expressed in each piece of content is positive, negative, or neutral towards the topic.

"Content Pulse" refers to the virality score; average traffic speed of messages about a topic. The algorithm to accomplish this involves:
1. Noting the number of items of content (text, images, videos, or any other form) returned for a search on a particular topic;
2. Determining the interval between timestamps for each piece of content;
3. Adding up the timestamp intervals;
4. Dividing the sum of the timestamp intervals by the number of pieces of content returned; and
5. Creating a table on which timestamp values are fitted to corresponding non-numerical scores (for example, high virality might be represented by a score of "A+", and low virality might be represented by a score of "F").

Virality direction as used herein refers to the score indicating increasing or decreasing virality of a topic.

The algorithm for determining virality direction involves:
1. Creating a graph with an "X" axis and a "Y" axis; wherein:
 a) The X axis will mark the positions of the pieces of content in reverse order, such that the newest piece of content is at the "1" position on the X axis, and the oldest piece of content is given the "N" position on the X axis, with N being the total number of pieces of content (for example, if 100 pieces of content were returned in the search, then N is 100, and the oldest piece of content will have the 100 s position on the X axis);
 b) The Y axis will indicate time value from 0 to infinity;
2. Plotting the time value (Y coordinate) for interval between the timestamp of each piece of content and the one preceding it (X coordinate);
3. Drawing a least-squares line through all the plotted points;
4. Determining the slope of the resulting line (If the slope of the resulting line is positive, and the intervals are getting progressively shorter, then the virality of the topic is increasing; if the slope of the resulting line is negative, and the intervals are getting progressively longer, then the virality of the topic is decreasing); and
5. Indicating with a "+" when virality is increasing, and with a "−" when virality is decreasing.

Figure 1:
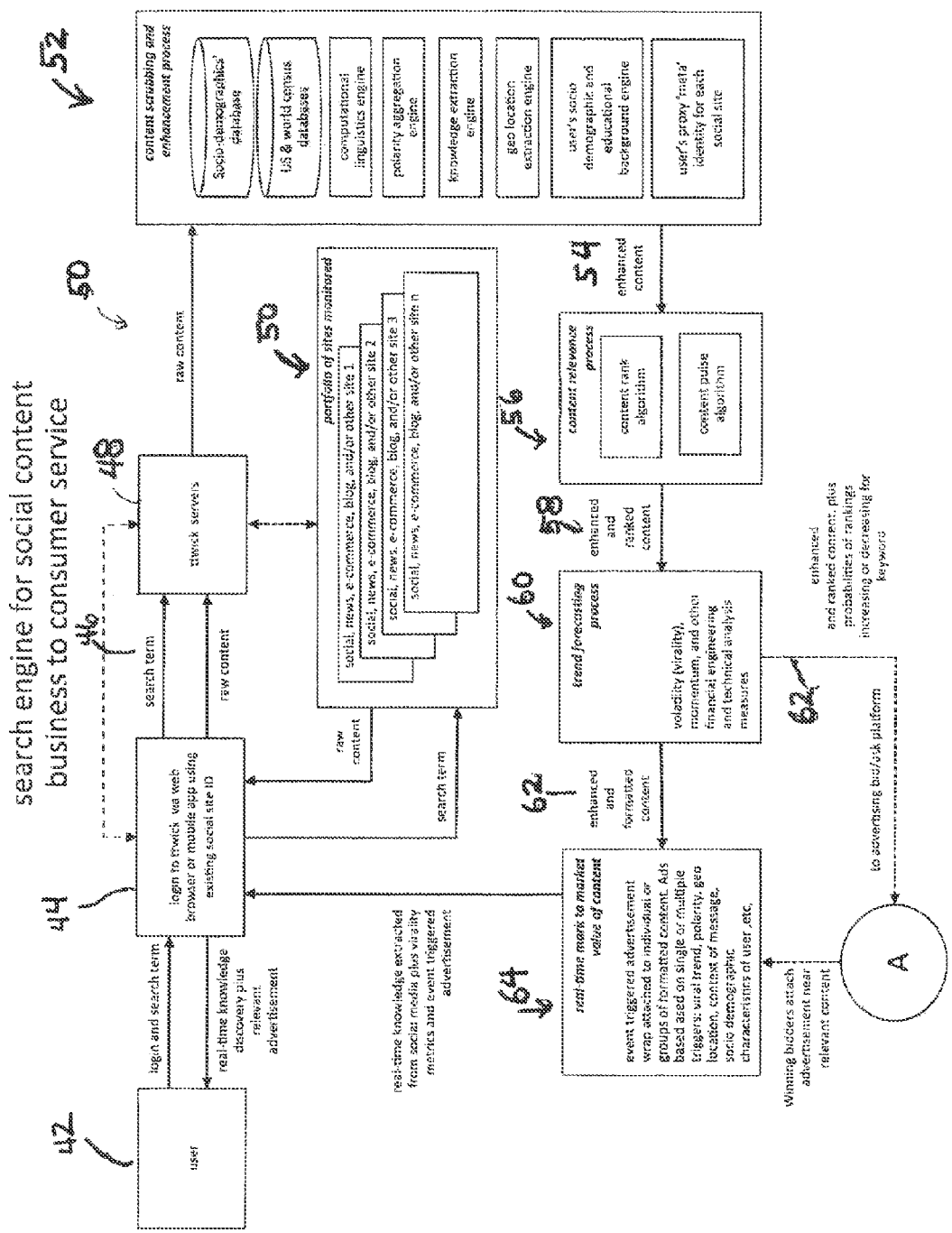
FIG. 1 is a schematic diagram of the system and method for carrying out an embodiment of the internet search system invention.

Turning to the drawings, FIG. 1 presents a diagrammatic view of the operation of the social content and media search engine of the present invention 40. The user 42 logs into the system using a log-in screen 44, which may be for example the Facebook or other social site log-in page, and enters a search term. The system processes the search using servers 48 including in the system of the present invention 40, which retrieves raw content from a portfolio 50 of monitored sites including social media websites, e-commerce sites, and blogging sites, among others. The raw content 50 is processed through the system's servers 48 and filtered by content scrubbing and enhancement algorithms 52, including a socio-demographic database, and U.S. and world census database, a computational linguistics engine, a polarity aggregation engine, a knowledge extraction engine, a geolocation extraction engine, an engine to extract the user's socio-demographic and educational background, and a user's proxy "meta" identity for each social site.

Following the scrubbing and enhancement process, the processed and enhanced content 54 is further processed by a content relevance process 56, which includes a content rank algorithm and a content pulse algorithm to place the content in an order according to its popularity and virility mainly on social media websites. Following that, the enhanced and ranked content 58 undergoes a trend forecasting process 60, where its volubility or virality, momentum, and other financial engineering and technical analysis measures known in the art are used to create probability rankings to estimate the likelihood that the rankings of the keyword will increase or decrease. The results 62 of this forecasting process are forwarded to a portion of the system that calculates a real time mark to market value of the content 64. The results 62, along with probability rankings, are also forwarded to an advertising bid/ask platform (FIG. 2) where prospective advertisers receive messages about keywords of interest and can bid, auction style, on the amount they are willing to pay to have an advertisement appear alongside a particular item contained in the content collection. The content collection gets further formatted into, for example, a format of choice, for which may be a magazine, newsletter, newspapers, journal, scrapbook, or the like, depending on subject matter search, user preferences, and the like.

Figure 2:
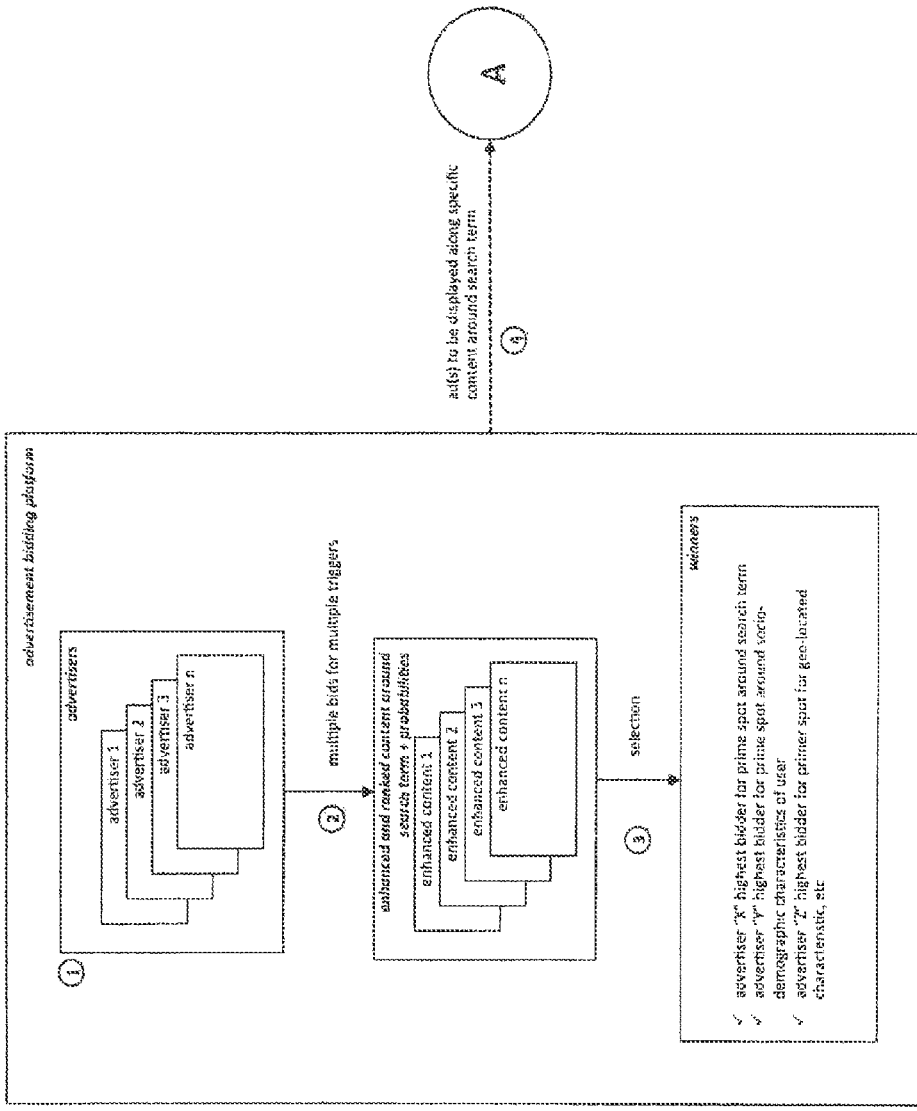
FIG. 2 is a schematic drawing illustrating the operation of an advertising action feature of the system of FIG. 1.

FIGS. 1 and 2 further illustrate the business to business aspect of the present invention, which permits sale of advertising by auction to advertisers who may have expressed an interest in particular subjects, keywords, topics, or celebrities, for example. In addition, advertisements may be triggered once certain preset numerical levels of certain chosen metrics (such as virality score, popularity score, polarity score, or the like) have been reached. The trigger can be limited by geography or demography also, for example. Before that, the system offers prospective advertisers the opportunity to place a bid for particular keywords, and then receives and posts the bid to the bidders, allowing them to respond with a higher bid, if desired, until a winner emerges and the other bidders drop out. The winning bidder's advertisement is then inserted into the search results compendium in the appropriate place when the keyword reaches a defined level, as stated above. In the example discussed herein, the search results showed a video of President Obama on a skateboard receiving significant attention on social media (views, likes, dislikes, comments, and shares), creating an opportunity for a skateboard manufacturer to have its ad appear on the same or different "page" as the video that was "going viral."

The present invention provides a non-transitory computer-readable storage medium storing instructions executable by a computer system, the non-transitory computer-readable storage medium comprising instructions to at least one computer system that receives a specified search topic from a user's personal computer, laptop, tablet, smartphone, or other computing device or terminal for the specified search topic. The system also has instructions to search as one or more social media networks, news or other websites, blogs or blogging websites and/or e-commerce sites to identify messages posted to the one or more social media or other websites related to the specified topic. The storage medium receives a selection of one or more attributes potentially associated with each of the identified messages from the remote computer classifies each of the identified messages according to the one or more selected attributes generates a visual representation indicating a quantity of the identified messages classified according to the one or more selected attributes; and causes the visual representation to be provided to the remote computer. The one or more selected attributes, may include a time at which each of the identified messages was posted. The selection of the one or more attributes enables a further selection as to a range of times at which each of the identified messages was posted, and it may include a geological location from which each of the identified messages was posted. Further, the visual representation includes a graph indicating a number of the identified messages that were posted during each of a number of time periods. The graph may be a histogram.

The selection of the one or more selected attributes enables a further selection as to a plurality of geolocations to be included. The invention may display the visual representation as a map indicating a quantity of the identified messages that were posted from each of a plurality of geolocations, or as a graph indicating a quantity of the identified messages that were posted from each of a plurality of geolocations. The geolocation may be a local community, a municipality, a state, a province, a region, a nation, and a continent, while the selected attribute may include one of relationships and flows between entities participating in the one or more social media networks. Additionally, the visual representation includes a social network visualization representing one of the relationships and the flows between the entities participating in the one or more social media networks.

The invention further comprises parsing content of each of the identified messages to determine the one or more attributes from the content of each of the identified messages. One or more attributes includes a sentiment indicating one of a favorable attitude toward the specified topic, a neutral attitude toward the specified topic, or an unfavorable attitude toward the specified topic.

In another embodiment, the visual representation includes a graph indicating a quantity of the identified messages indicating one of the favorable attitudes toward the specified topic, the neutral attitude toward the topic and the unfavorable attitude toward the topic. Additionally, the invention further comprises calculating a subjectivity index indicative of what proportion of the identified messages indicate either the favorable attitude toward the specified topic and the unfavorable attitude toward the specified topic as compared to a total of the identified messages that indicate any of the favorable attitude toward the specified topic, the neutral attitude toward the specified topic, and the unfavorable attitude toward the specified topic. In operation, the invention calculates the subjectivity index, I, according to an equation including:

$$I = (\text{Total Favorable} + \text{Total Negative})/(\text{Total Favorable} + \text{Total Negative} + \text{Total Neutral}),$$

wherein:
Total Favorable includes a quantity of the identified messages indicating the favorable attitude toward the specified topic;
Total Unfavorable includes a quantity of the identified messages indicating the unfavorable attitude toward the specified topic; and
Total Neutral includes a quantity of the identified messages indicating the neutral attitude toward the specified topic.

The subjectivity index may be included in the visual representation, and the visual representation includes a graph indicating the language in which each of the identified messages was posted. The one or more attributes includes a language in which each of the identified messages was posted, and may include a reference to a future time. The future time preferably includes at least one of a future time, a future date, or one of a plurality of terms indicating a subsequent time. Moreover, the plurality of terms indicating a subsequent time include one or more of soon, later, tonight, tomorrow, next week, next month, and next year. The invention may also semantically analyze the content of the identified messages based on parsing the content of each of the identified messages. This may include identifying a list of words most frequently included in the identified messages, and may include a predetermined number of entries.

The invention preferably omits common connector words from the list of words most frequently included in the identified messages, such as one or more of and, but, a, an, or, and the. The invention may also classify words included in the list of words most frequently included in the identified messages according to parts of speech represented by the words included in the list of words most frequently included in the identified messages. The parts of speech include two or more of nouns, verbs, adjectives, adverbs, place names, proper names, and words indicative of time, and may also involve determining a quantity of each of the parts of speech represented in the list of words most frequently included in the list of identified messages. The quantity of each of the parts of speech includes a proportion of the part of speech represented in the list of words most frequently included in the list of identified messages. Further, the visual representation of the quantity of the words apportioned a pre-determined ratio of the parts of speech represented in the list of words most frequently included in the list of identified messages.

The quantity of the identified messages classified according to the one or more selected attributes is expressed as a total, as a fraction, or as a percentage. The visual representation may include one of a table, a map, a histogram, a bar graph, a line graph, and pie chart, and it may be selected from a remote computer.

The selection may cause an advertisement to be provided to the remote computer based on the specified topic. Preferably the advertisement is topically related to the specified topic, and the advertisement is selectively associated with the specified topic by an advertiser. The system can cause an advertisement to be provided to the remote computer based on information accessible about a user of the remote computer or other computing device, and can elicit remuneration from a user of the remote computer or other computing device.

The invention further provides at a server computer system in communication with an Internet enabling communication with server computers hosting one or more social media networks and a remote computer comprising: receiving specification of a topic from the remote personal computer, laptop, tablet, smartphone, or other computing device, for the specified topic, searching the one or more social media networks to identify messages posted to the one or more social media web sites related to the specified topic, receiving a selection of one or more attributes potentially associated with each of the identified messages from the remote computer, automatically classifying each of the identified messages according to the one or more selected attributes, generating a visual representation indicating a quantity of the identified messages classified according to the one or more selected attributes, and causing the visual representation to be provided to the remote computer.

The one or more selected attributes may include a time at which each of the identified messages was posted, and a geolocation from which each of the identified messages was posted. The selected attribute may include one of relationships and flows between entities participating in the one or more social media networks. The method may further comprise parsing content of each of the identified messages to determine the one or more attributes from the content of each of the identified messages. The attributes may be a sentiment indicating one of a favorable attitude toward the specified topic, a neutral attitude toward the specified topic, and an unfavorable attitude toward the specified topic, it may also include the neutral attitude toward the specified topic when the sentiment is not determined to indicate either the favorable attitude toward the specified topic or the unfavorable attitude toward the specified topic.

The method may further comprise calculating a subjectivity index indicative of what proportion of the identified messages indicate either the favorable attitude toward the specified topic and the unfavorable attitude toward the specified topic as compared to a total of the identified messages that indicate any of the favorable attitude toward the specified topic, the neutral attitude toward the specified topic, and the unfavorable attitude toward the specified topic.

In one embodiment, the subjectivity index, I, is calculated according to an equation including:

$$I = (\text{Total Favorable} + \text{Total Negative}) / (\text{Total Favorable} + \text{Total Negative} + \text{Total Neutral}),$$

wherein:
Total Favorable includes a quantity of the identified messages indicating the favorable attitude toward the specified topic;
Total Unfavorable includes a quantity of the identified messages indicating the unfavorable attitude toward the specified topic; and
Total Neutral includes a quantity of the identified messages indicating the neutral attitude toward the specified topic.

The subjectivity index may be a visual representation. The one or more attributes may include a language in which each of the identified messages was posted. The visual representation may include a graph indicating the language in which each of the identified messages was posted. The one or more attributes may include a reference to a future time, which may in turn include at least one of a future time, a future date, or one of a plurality of terms indicating a subsequent time. The subsequent time may include one or more of soon, later, tonight, tomorrow, next week, next month, and next year, or specific dates, points, or ranges of time.

The method preferably can semantically analyze the content of the identified messages by parsing the content of each of the identified messages. Semantically analyzing the content of the identified messages includes identifying a list of words most frequently included in the identified messages. The list of words most frequently included in the identified messages includes a predetermined number of entries, but omits common connector words from the list of words most frequently included in the identified messages, such as one or more of and, but, a, an, or, and the. The method additionally classifies words included in the list of words most frequently included in the identified messages according to parts of speech represented by the words included in the list of words most frequently included in the identified messages. The parts of speech include two or more of nouns, verbs, adjectives, adverbs, place names, proper names, and words indicative of time, and the method determines a quantity of each of the parts of speech represented in the list of words most frequently included in the list of identified messages. The quantity of each of the parts of speech includes a proportion of the part of speech represented in the list of words most frequently included in the list of identified messages. In addition, the method may include in the visual representation the quantity of the parts of speech represented in the list of words most frequently included in the list of identified messages.

In one embodiment, the quantity of the identified messages classified according to the one or more selected attributes is expressed as a total. In another embodiment, the quantity of the identified messages classified according to the one or more selected attributes is expressed as a fraction, or a percentage. In a further embodiment, the visual representation includes one of a table, a map, a histogram, a bar graph, a line graph, and pie chart. The method can also cause an advertisement to be provided to the remote computer based on the specified topic, and the advertisement may be topically related to the specified topic. The advertisement may be selectively associated with the specified topic by an advertiser. Finally, the method can cause an advertisement to be provided to the remote computer based on information accessible about a user of the remote computer, and it can accept remuneration from a user of the remote computer. The user can also earn loyalty points or credits by using the system. The advertisement can be selectively displayed when predetermined levels of vitality, popularity, and/or polarity are reached for a specific topic.

Figure 3:
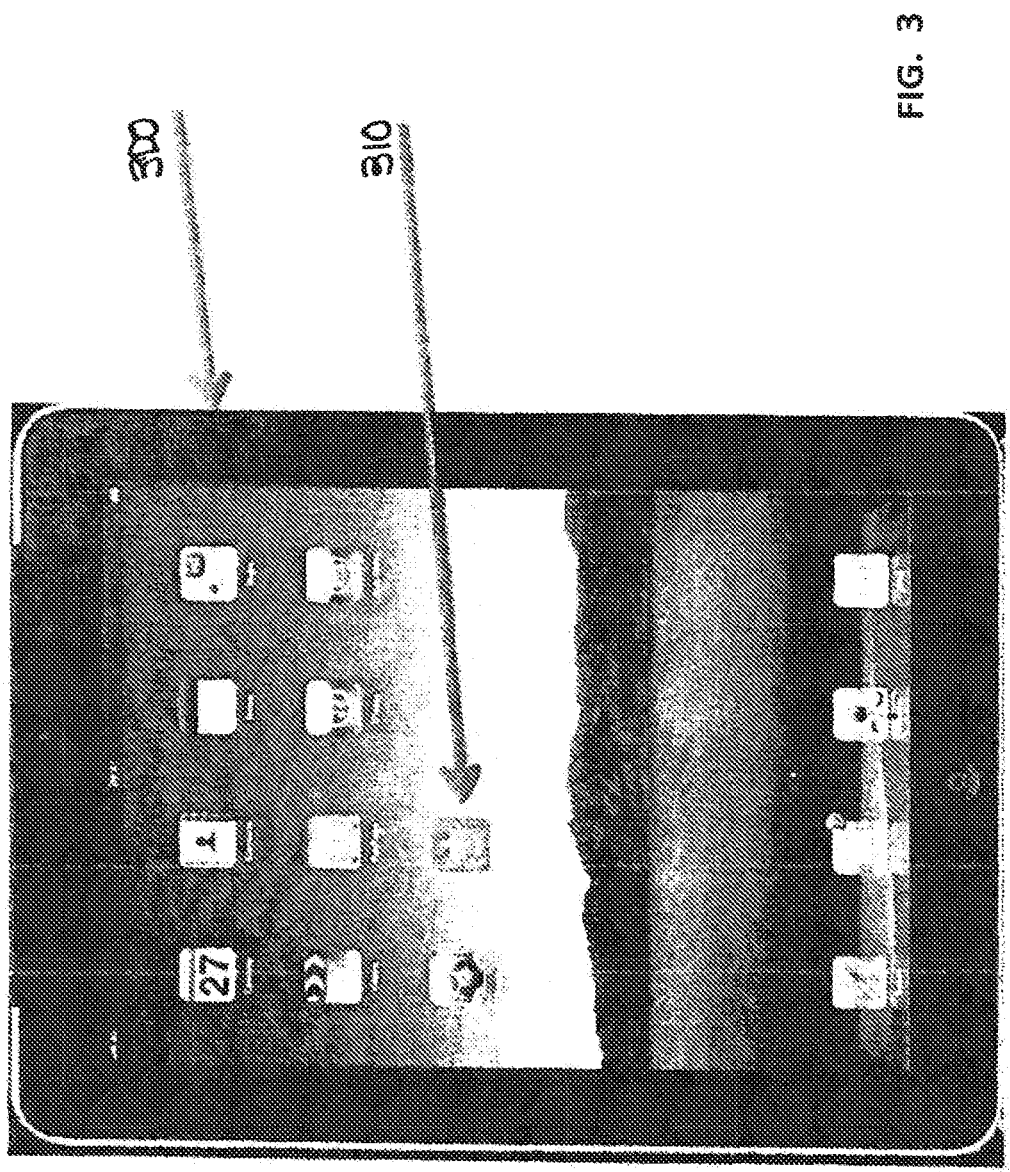
FIGS. 3 through 20 are screenshots of a demonstration illustrating various features of the embodiment of the invention shown in FIG. 1.
Figure 4:
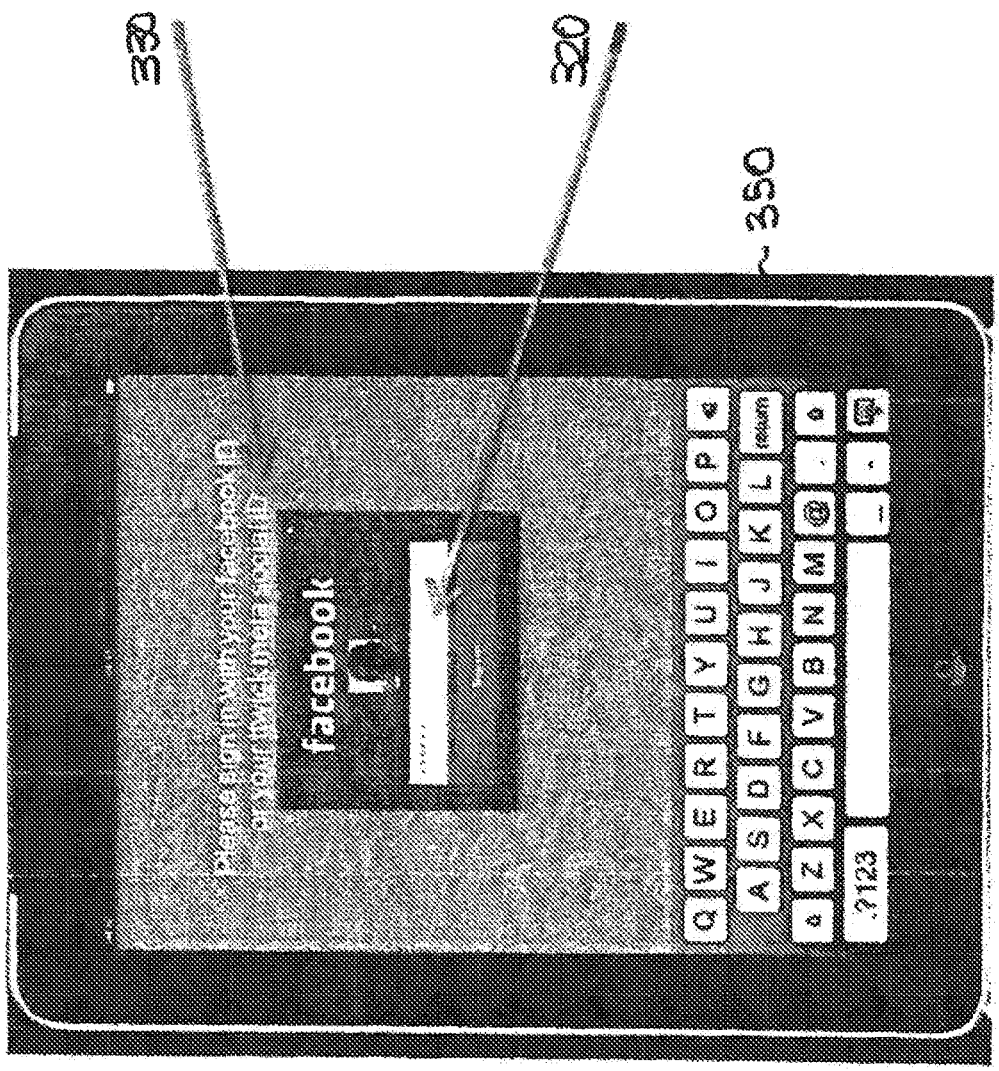
Figure 5:
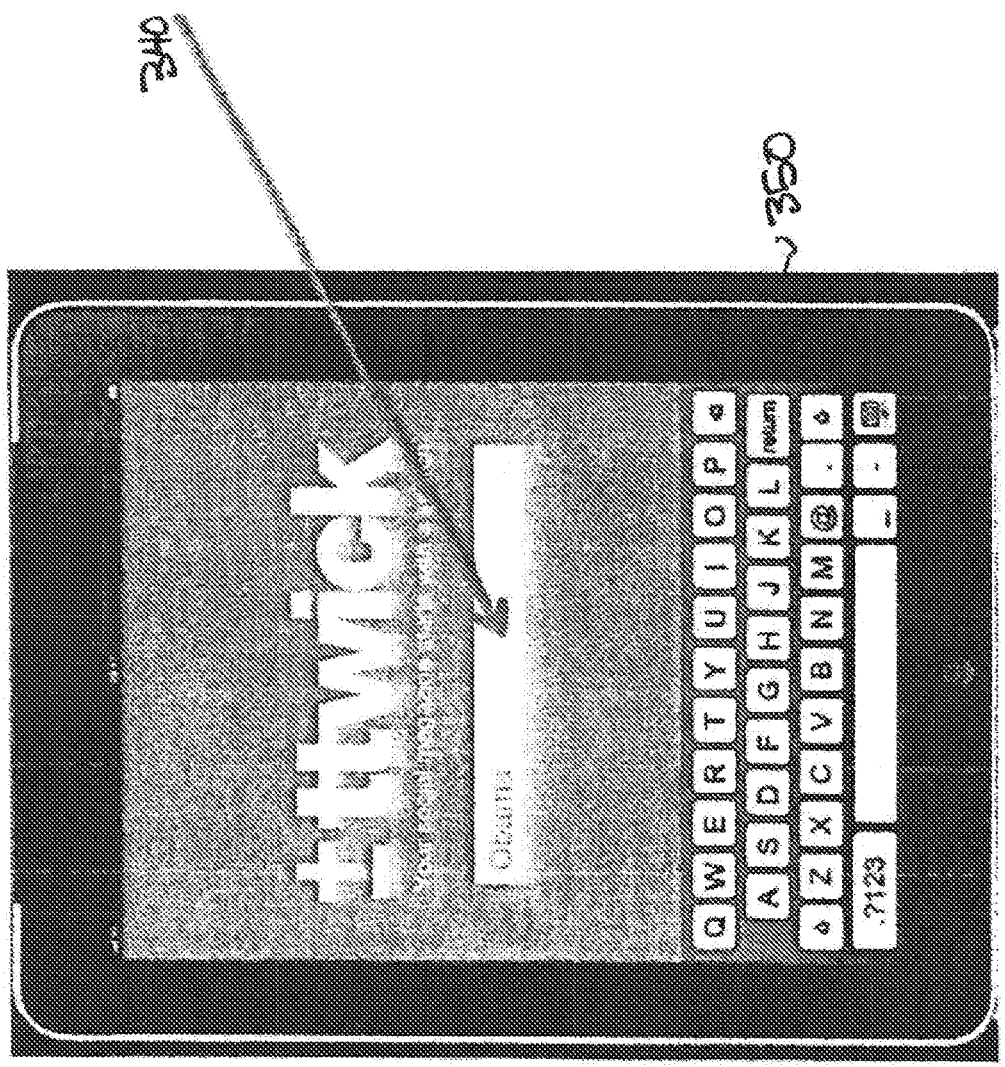

The search engine system of the present invention will now be described with reference to a particular example of a search including social and other internet and websites. FIG. 3 shows a tablet 300 having an icon to launch the search engine of the present invention, it being understood that the search engine can also be run on a personal computer, laptop, smartphone, iPod, mobile phone or other electronic computational device capable of connecting to the Internet through a network. The user activates the icon, which opens the application for the search engine of the present invention. As shown in FIG. 4, a log-in screen appears asking the user to sign in with a Facebook ID and password (for example), or other social media log-in 320 or the proprietary log-in for the system of the present invention 330, known as a "ttwick meta social ID."

Following successful log-in, the search engine recalls or gathers information about the user either from servers operated by the present system (see FIG. 1), or from social media sites to which the users subscribe or belong. These sites can be identified by the user in a preliminary questionnaire or drawn from the Internet using the search and storage capabilities of the present invention. Next, the search engine offers the user a search bar 340 into which the user types or otherwise enters (using Siri or other voice activated system, for example) a search term on which the user desires to collect information, and the presses the "enter" or "return" key 350 to commence the search.

Figure 6:
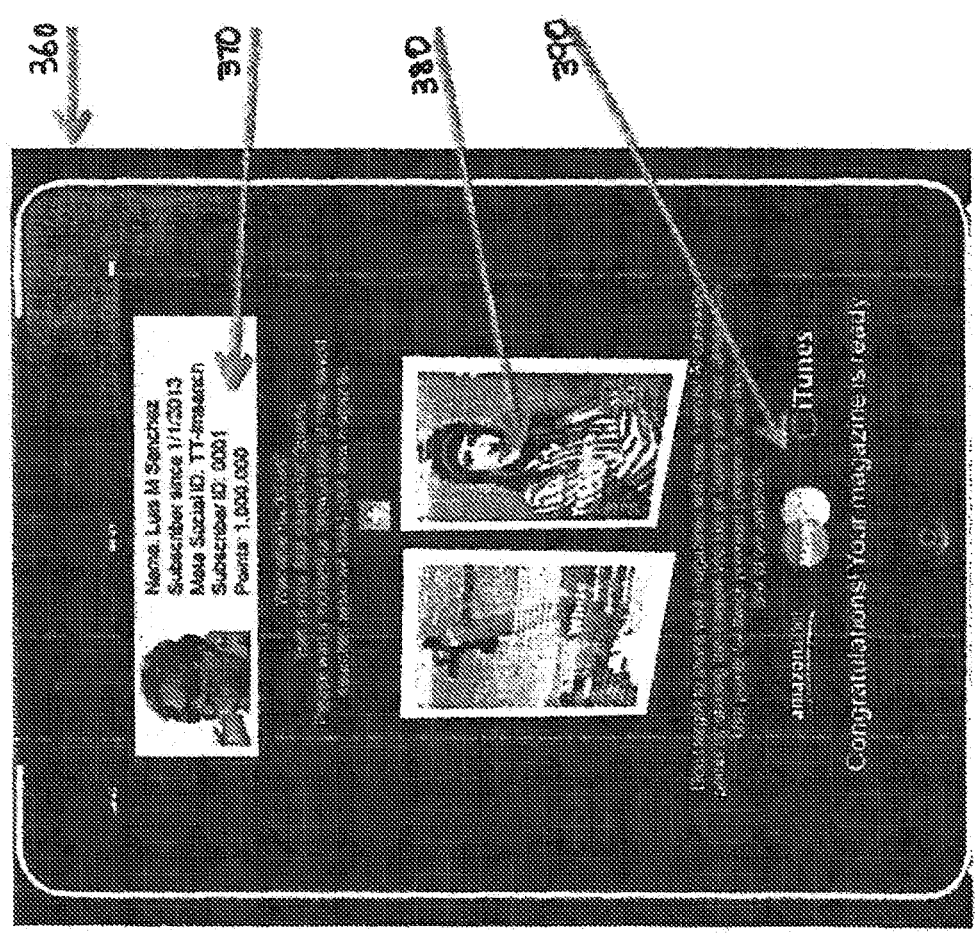

While the search proceeds (see FIG. 6) and the system 300 gathers social media and other content, the system 300 may display an intermediate screen 360 that shows the user's profile summary 370, including a library of previous search compendia 380 displayed in the form of previous real time magazines. The screen 360 may also display clickable icons for strategic partners 390 where accumulated usage and bonus points may be redeemed or purchaser made, or paid advertisements of interest to the user, which is in effect a short commercial break displayed during the search process.

Figure 7:
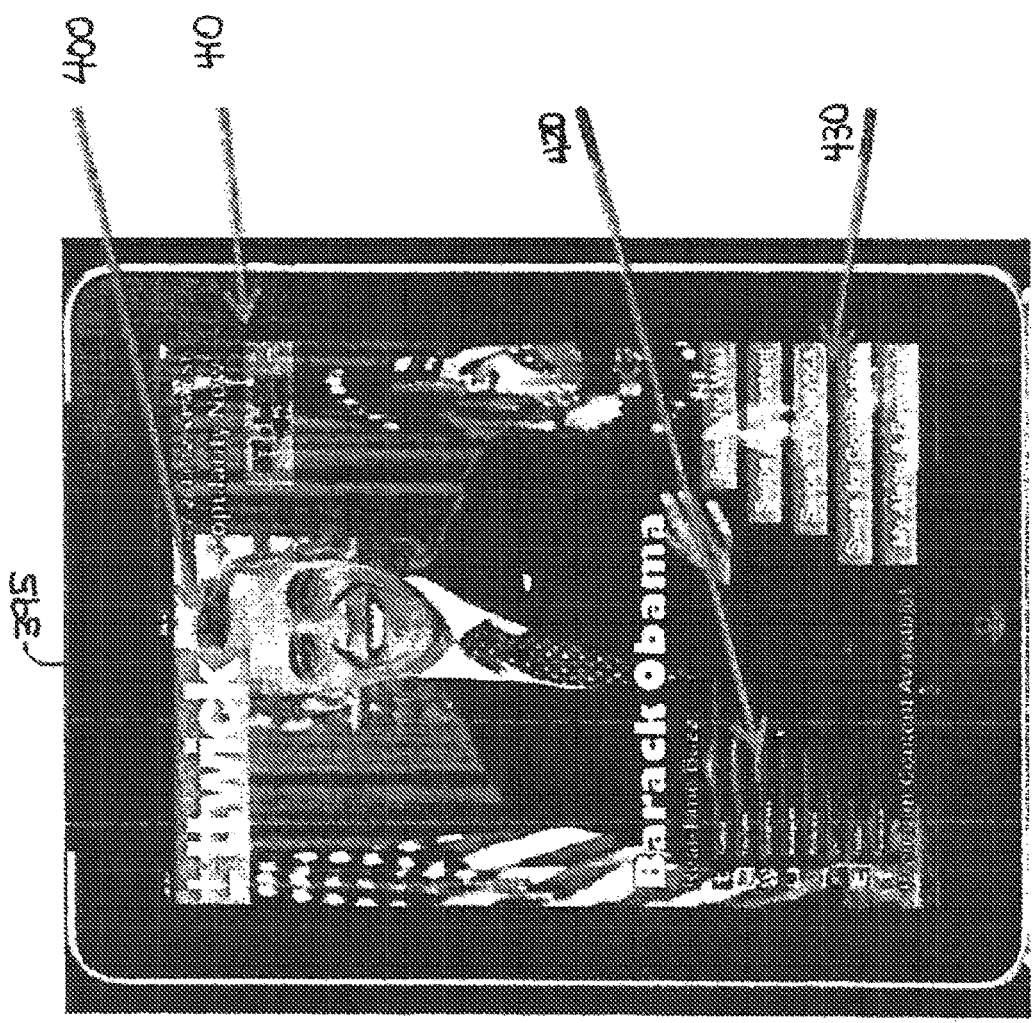
Figure 8:
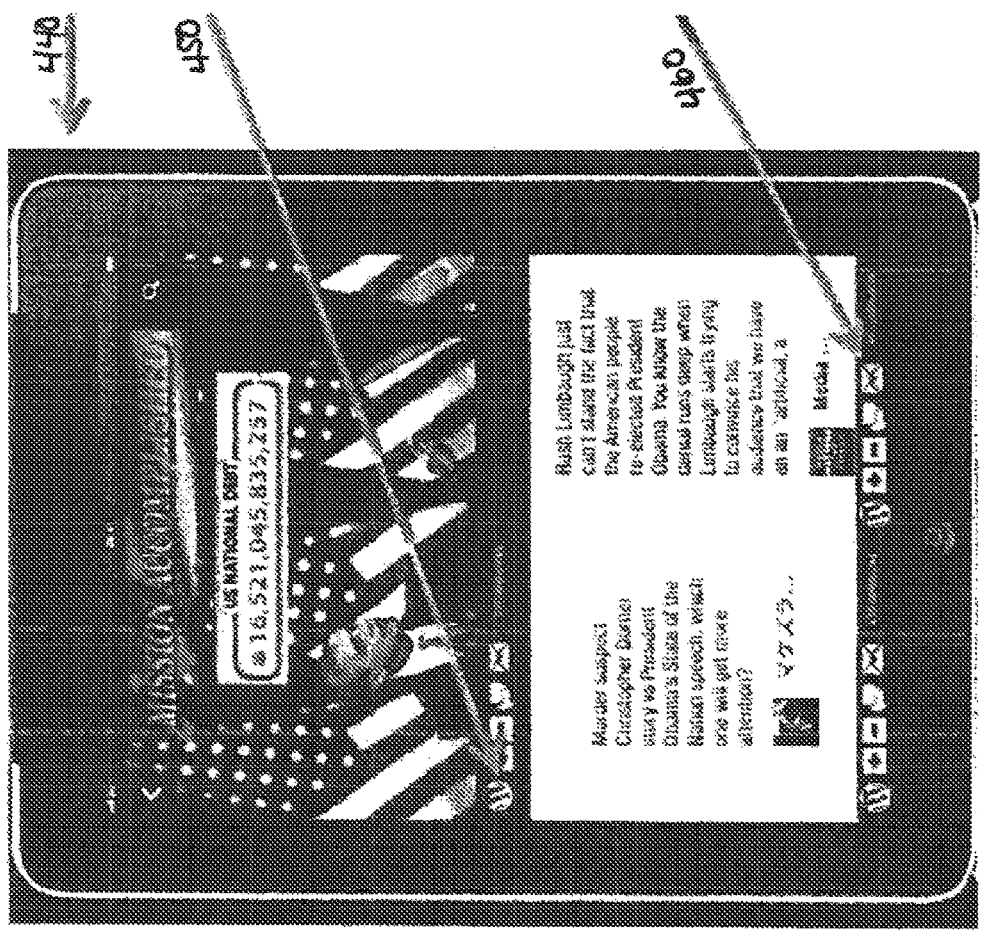

Once the search engine of the present invention completes the search and assembles and organizes the collected results, it will display the results in a user friendly real time magazine format 395 that the user can review (FIG. 7). The magazine includes a cover 400 featuring a photograph, drawing, or other image that represents the subject matter of the search, in this case, President Barack Obama. Accompanying or superimposed on the magazine cover 400, the user finds the display of a real time score 410 reflecting the popularity of the search term, a reflection of the degree to which other social media users tend to have a positive perception about this topic more or less in comparison to other current topics of interest. The cover 400 also includes "bars" 420 that indicate sources of social media content, arranged by order of volume, also displayed under the monitor "Real Time Buzz," by website or other online application (for example, Tumblr, YouTube, WordPress, Google Plus(G+), Twitter, and Facebook) or any other platform. The cover also includes tabs 430 that retrieve information such as a Wikipedia page related to the search topic or navigate to specific sections of the "magazine."

As the user begins to browse the magazine 400 contents, by displaying screens following the cover 400. Although the particular order of display may vary according to user or originator preference, in a preferred embodiment, the search engine first displays social media content on the screen 440, with an icon 450 showing the source thereof (in this case a WordPress blog), along with other buttons that allow the user to comment, forward, "like," "dislike," or share the content through social media websites. The "dislike" feature which is unique, provides valuable information to analysts and marketers.

Figure 9:
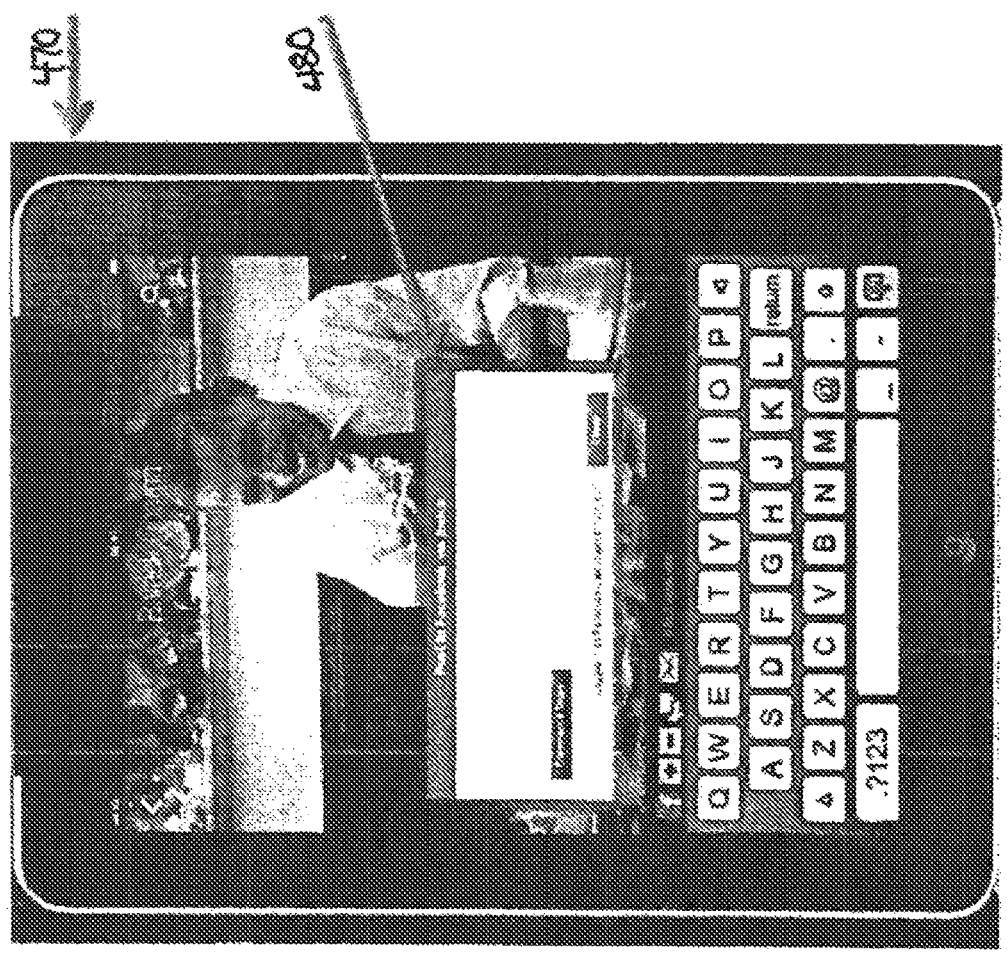

The user turns the "page" (FIG. 9) and the search engine displays additional social media content 470. On this page, the user chooses to comment on the previous page through Facebook (for example) 480, although of course other websites or social media sites can be used to post a comment (not shown).

Figure 10:
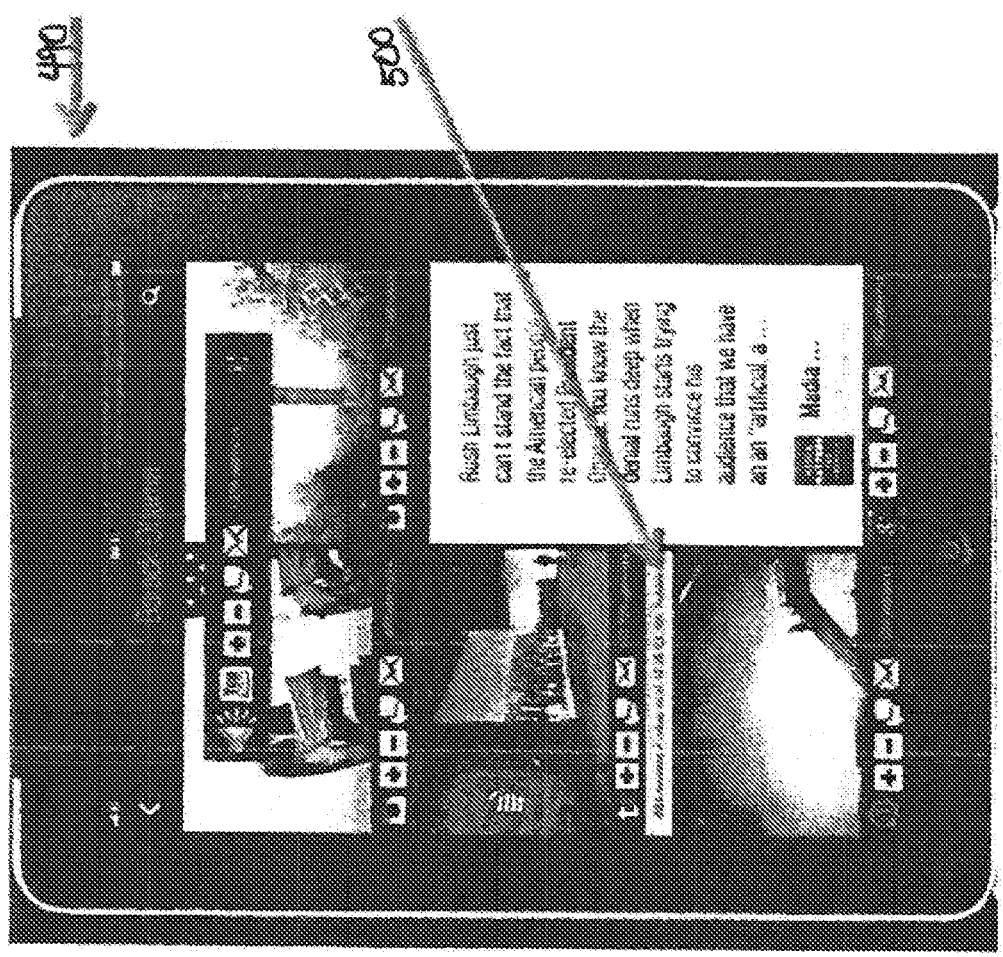

FIG. 10 shows further social media responsive to the search inquiry, here displayed as split screens to present several additional items of information from different social media websites simultaneously to limit the amount of page turning or scrolling the user must do to review the numerous responses for a particular search. The search results also preferably presents a "virality alert," that indicates that a content item, such as an article, comment, image, tweet, video, or other form of social medium entry has received significant attention from viewers, and an algorithm included in the present invention collates demographic and geographic information related to the alert. In the present example, the search engine located a video of President Obama riding a skateboard across the stage at a conference at which he spoke, which generated significant attention from the general public, but also from a younger, male demographic group interested in skateboarding. This demographic and geographic information may be displayed as part of the virality alert 500.

Figure 11:
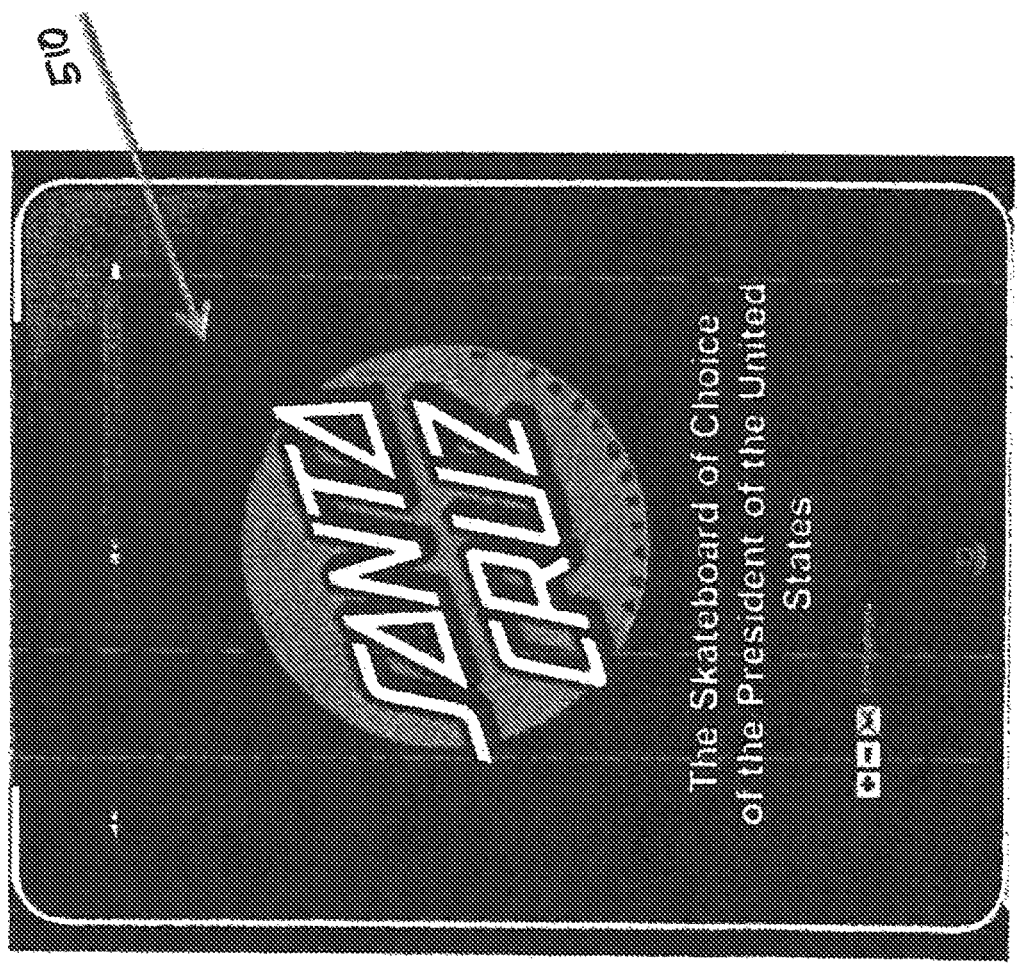

In an important aspect of the invention, the system has the ability to call up and display advertisements, announcements, or other items of interest in response to a "virality alert" appearing in response to the search. Thus, as illustrated in FIG. 11, the screen, or a portion thereof, displays an ad 510 for a skateboard (for example) in response to the social media entry on the previous page of President Obama on a skateboard. This feature seems particularly powerful, because the entity placing the ad, either the advertiser or its agency, can select an inflection point, meaning the ad will appear only if a certain level of traffic, virality, popularity, or other measure exists for the item, or if it fits other predetermined demographic or geographic criteria. Alternatively, the system can notify a plurality of possible advertisers and award the ad to the highest bidder, using an exchange system that allows the participants to bid in real time for the same ad space.

Figure 12:
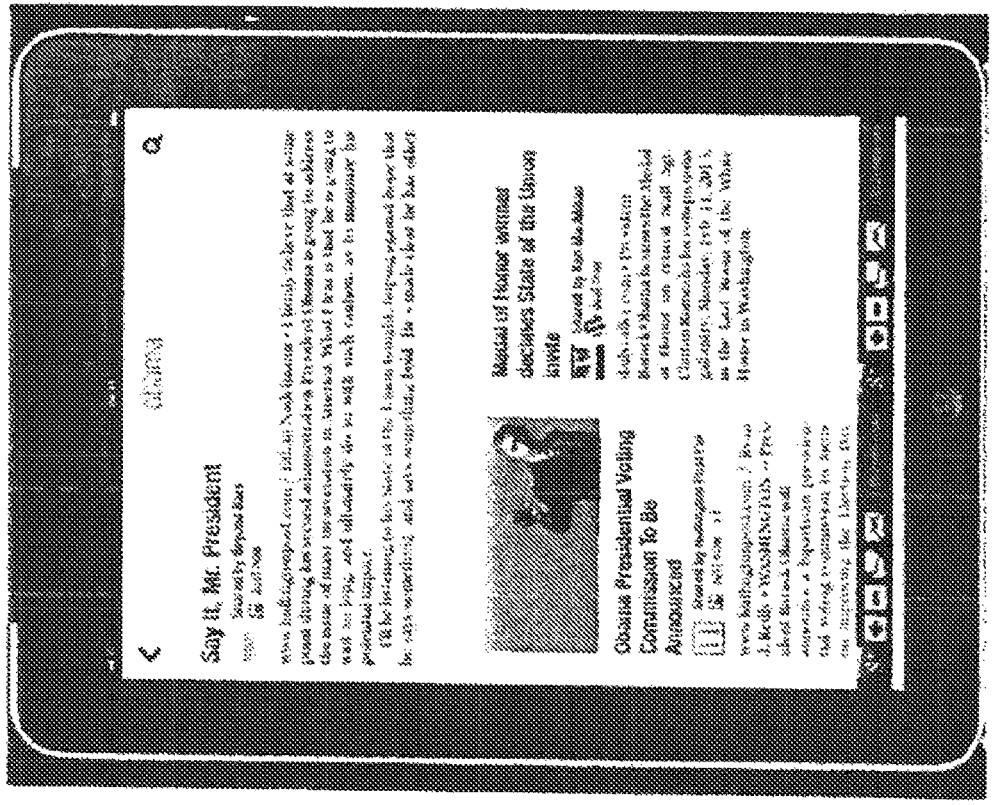
Figure 13:
Figure 14:
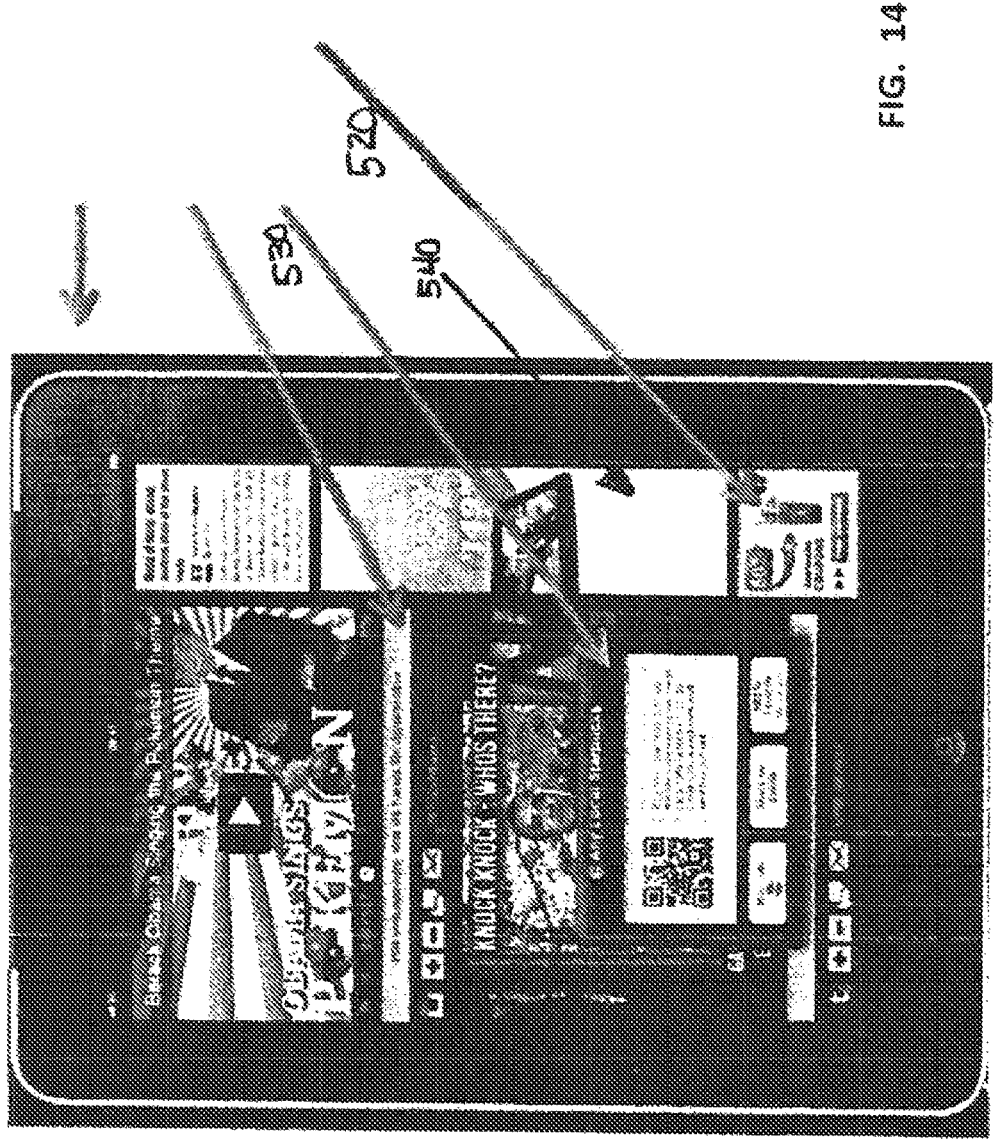

FIGS. 12 through 14 continue to display additional media content, and offer some or all of the additional features previously discussed, including virality alerts, source icons, forward or comment buttons, like or dislike buttons, and advertisements. Using these features to contact others or create or forward social media content (including likes, and dislikes) can earn the user loyalty points or credits that may be redeemed for various offers from strategic partners.

FIG. 14 also displays an additional feature and method in which the system can draw advertisers as discussed above, using a GPS locator or triangulation locator used by cell phone carriers to locate a user. Advertisements and notices can be then posted as ads in the magazine to offer the user a particular product or service. In FIG. 14, a chain of coffee shops offers a "cents off" coupon to users based upon their proximity to a store and perhaps based upon other factors such as previous percentage or previously expressed "likes" for the particular brand or one of their products, or any other factor determined by the advertiser. The ad may also connect the user to a social media site using a QR or bar code 530, or may be a traditional ad that displays a product, its price, and the store or other vendor selling the item 540.

Figure 15:
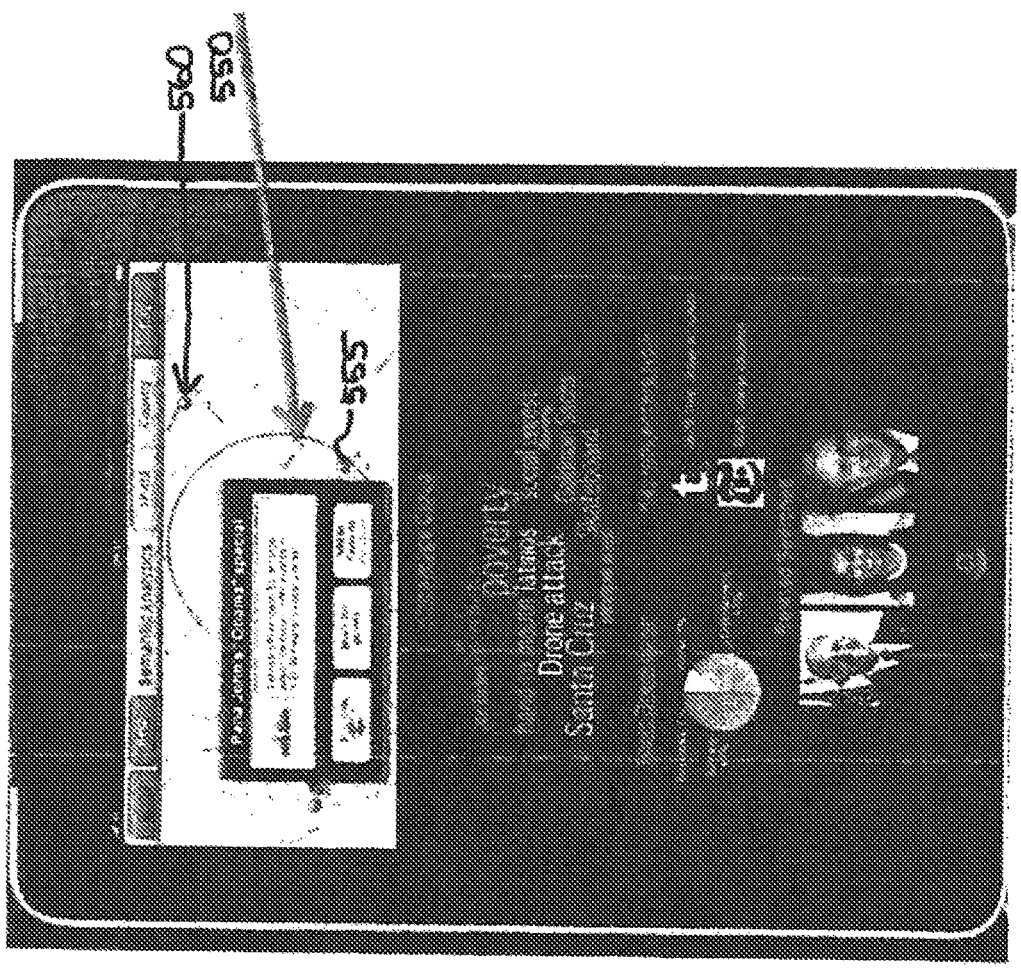

An additional feature, also making use of the user's location as transmitted, may be seen in FIG. 15, which displays a map 550 showing the user's location and any nearby sources of social media content located in the search 555. Clicking on the location pin 560 shown on the map retrieves information on the source and a link to the content located nearby. The user can review the content and communicate with the source. Merchants can insert location pins with ads or messages with an offer or offers generated in real time. The map can be zoomed in or out manually or by selecting a preset level of detail based on geographic division (for example, city, state, providence, country, etc.) to show additional or fewer locations and offers.

Figure 16:
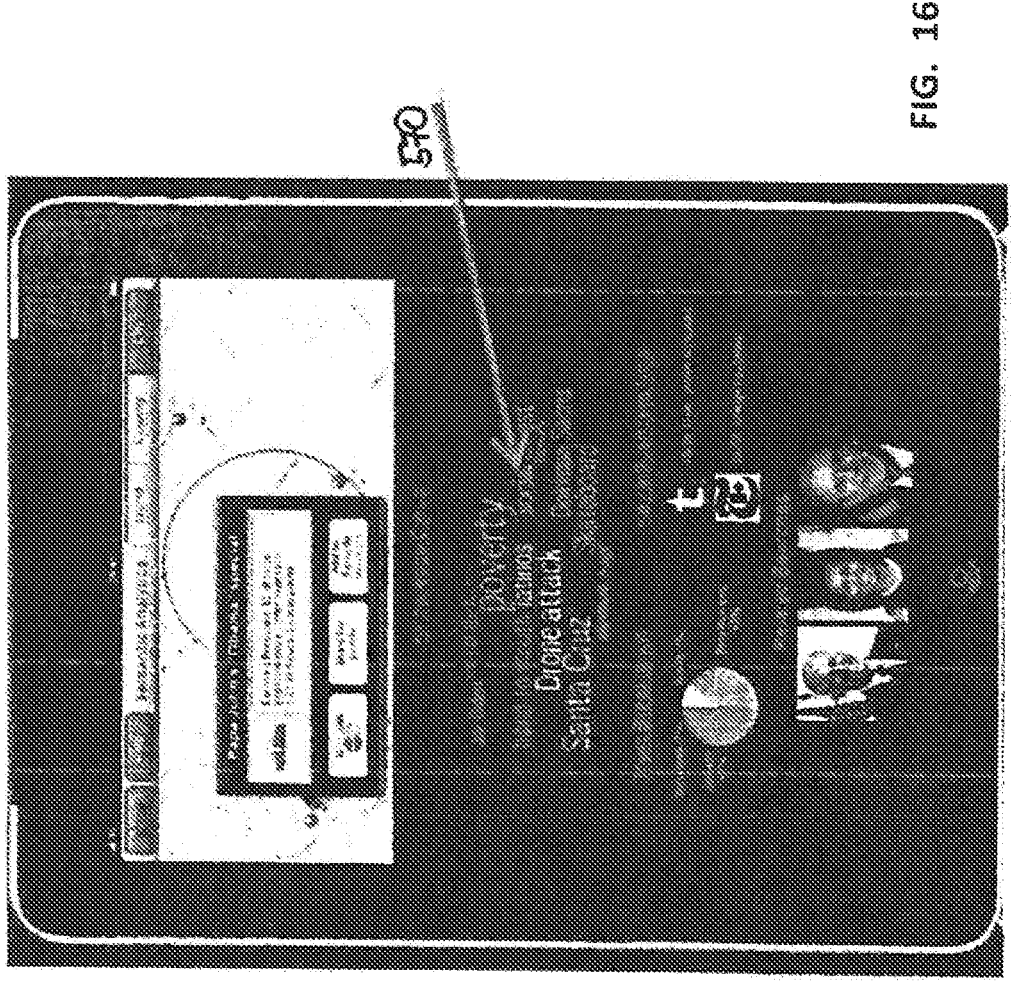

FIG. 16 displays a "knowledge cloud" 570, an important feature of the present invention. The knowledge cloud includes words arranged by part of speech and weighted by frequency and importance in relation to the search term. The words are distilled from the content returned in the search and displayed in real time. Thus, if a particular word, which represents a topic, receives significant attention on social media, its location on the cloud its relative size, color or intensity may change with time.

Figure 17:
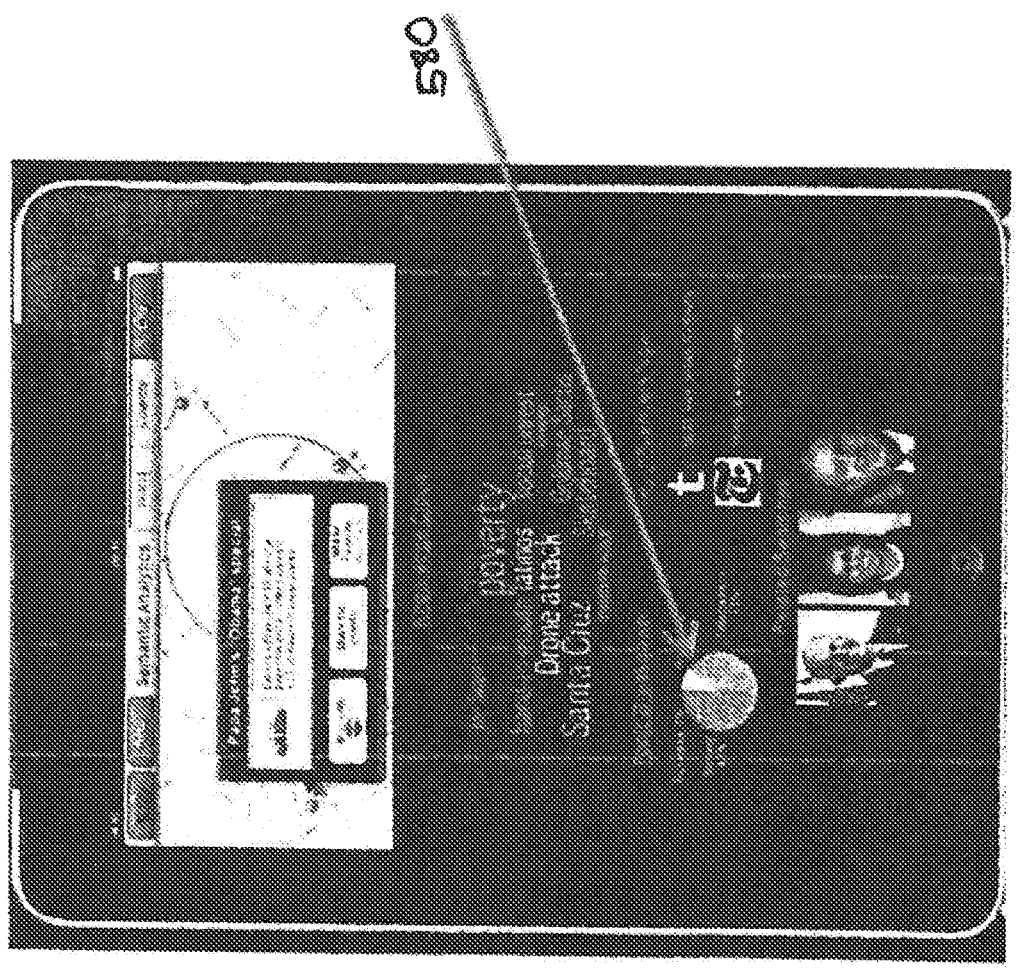
Figure 18:
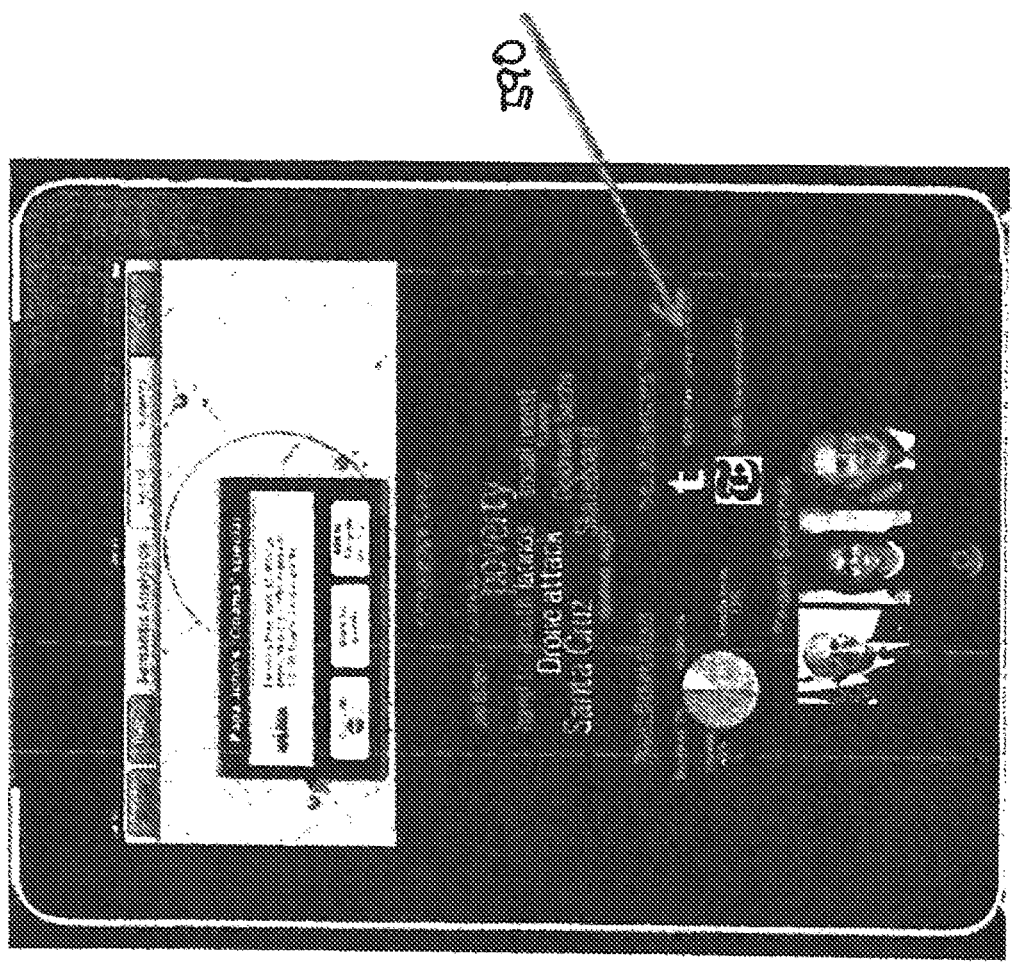
Figure 19:
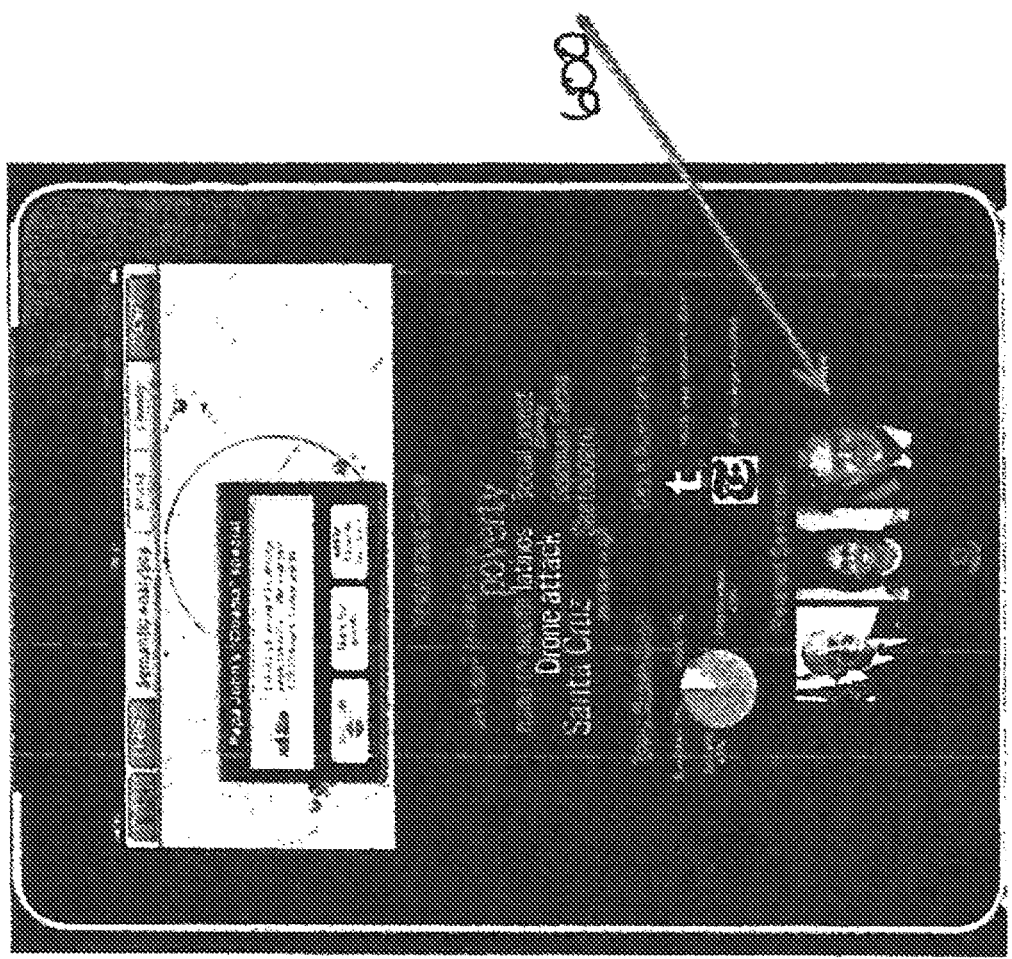

FIG. 17 shows the sub-topic break-down of the social medial content 580 as organized by a topic classifying algorithm that displays results in real time. FIG. 18 displays icons for key social media influencers on the search topic, emphasizing the demographic sectors creating highest impact, also in real time. In this embodiment, the screen displays two icons 590 showing the social media content most influential or appearing most often in the results. FIG. 19 displays some suggested related search topics 600. The system 300 suggests other search topics by analyzing search patterns of other users. In the example discussed herein, the system suggests Michelle Obama, Joe Biden, and George W. Bush, as possible other searches of interest, and presents their pictures, on which the user can check to initiate an additional search.

Figure 20:
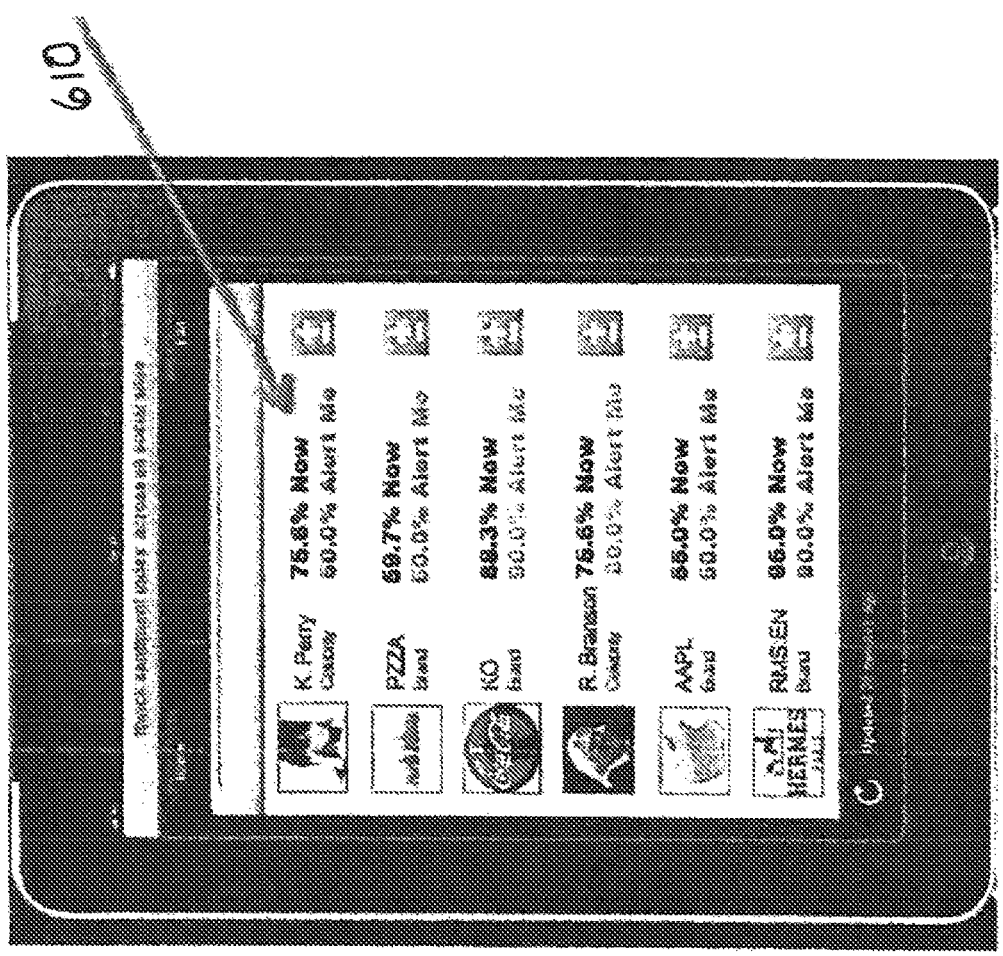

FIG. 20 illustrates another feature of the invention. The screen 610 displays alerts that the user has set for specific topics. The topics and levels are set by the user, and can reflect a rise or drop in social medial traffic, and/or a rise or drop in popularity.

Figure 21:
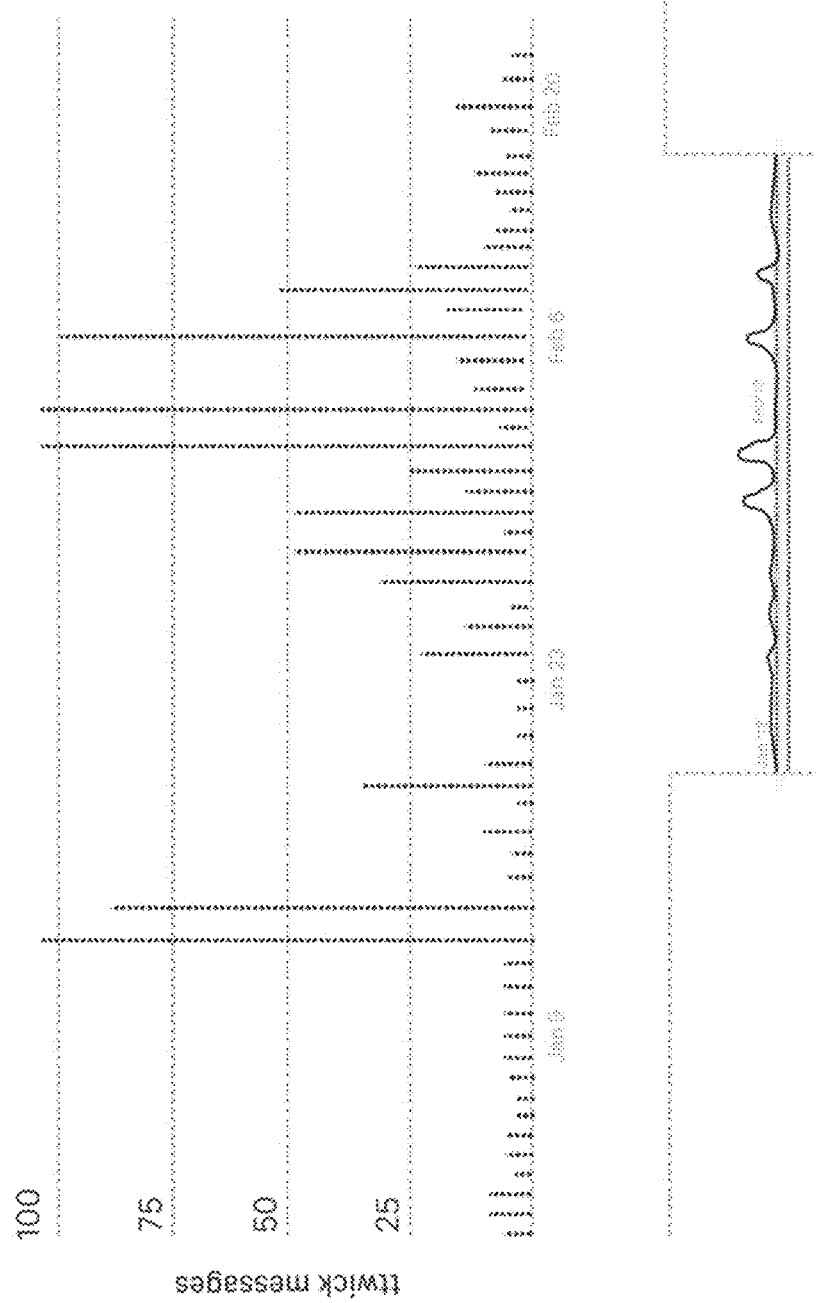
FIG. 21 is a graph showing volume of social media activity around the subject of interest.

FIG. 21 illustrates the open high low close chart used in the present invention to determine the volume of social media activity around a subject. The Open High Low Close (OHLC) chart shows the first stage in the transformation of a social media message into a metric indicating the volume of social medial activity around the subject. This is basically a message counter, which also shows the rate at which messages on the subject were sent. This metric shows spikes and downturns in message posting activity. This same format is used in trading environments, where the opening, high, low, and closing prices of securities for any day are displayed. The present invention defines its "trading day" as a set number of hours during which the system monitors messages transformed into metrics, and keeps track of the patterns that feed the algorithms used in the present invention. The lower graph shows total volume of messages returned by the search.

Figure 22:
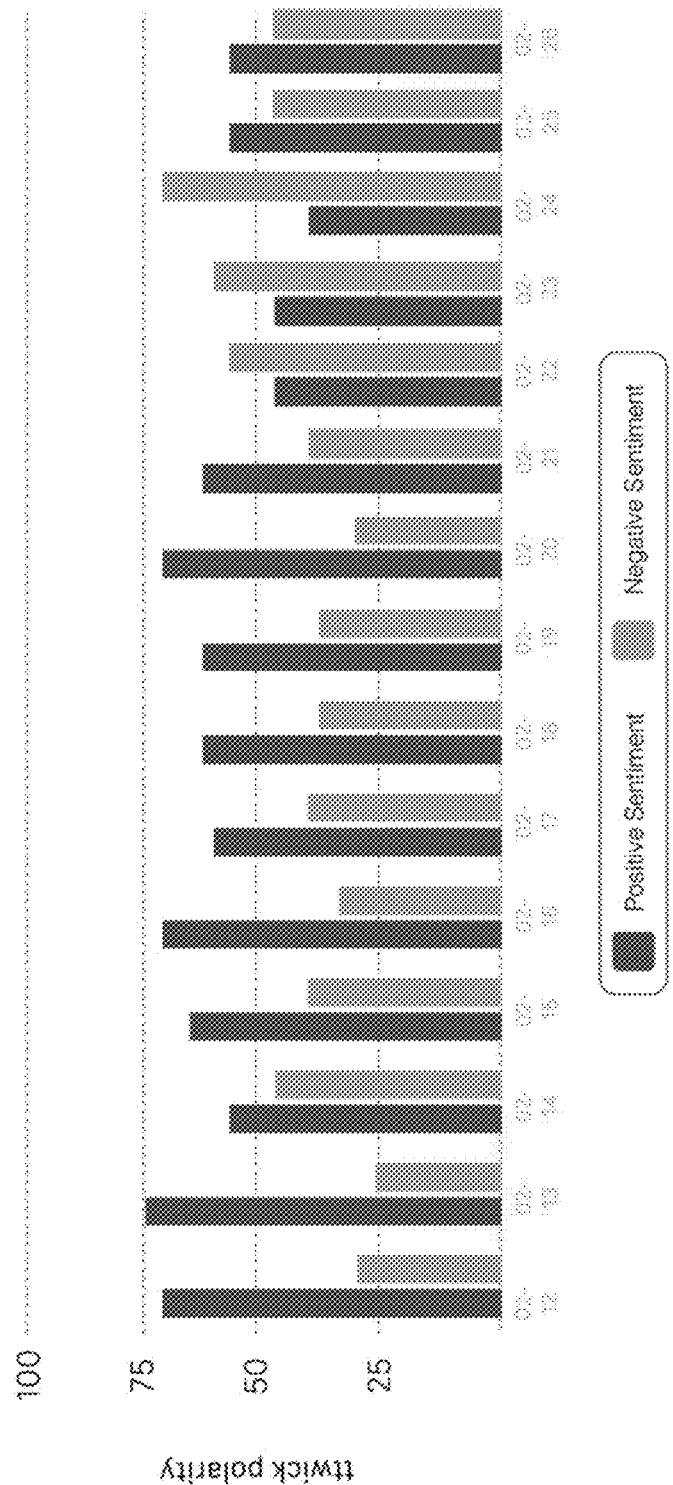
FIG. 22 is a graph showing relative polarization (both negative and positive) of social media users about a particular topic under analysis.
Figure 23:
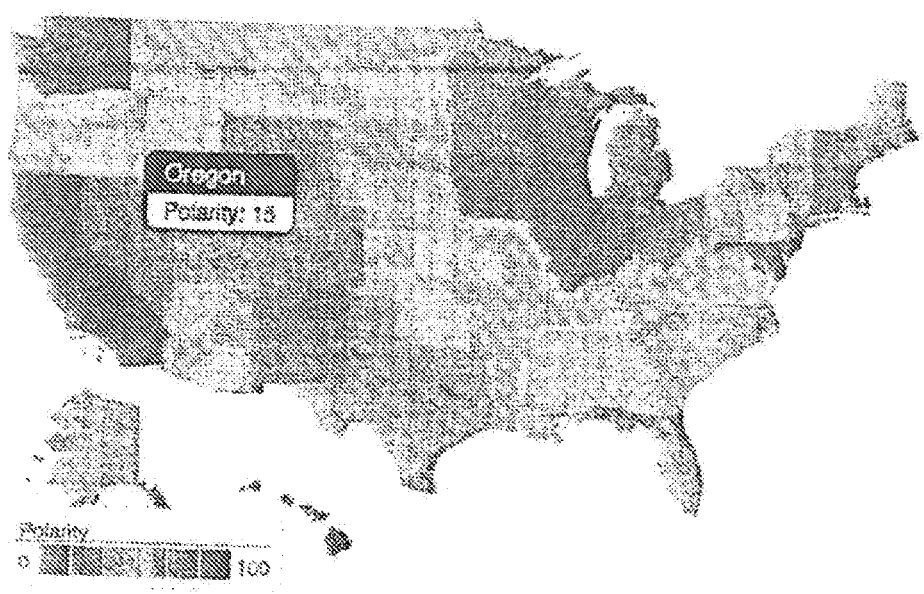
FIG. 23 is a map depicting where social media users tend to favor or disfavor a politician.

FIG. 22 shows polarization of social media users (both positive and negative) about a particular subject being analyzed, and on all topics related to the subject over the last 14 days, showing the relative proportions of positive messages to negative messages. Similarly, FIG. 24 shows another feature of the invention, a "heat map." This map shows, on a scale of 1 to 100, where in the U.S. social media users tend to like or dislike a subject, over all topics, and covering millions of data points that the system of the present invention has collected over several months. The number 1 indicates a state with very negative sentiment towards a subject, such as politician or even, and is displayed in red, for example. The number 100 indicates a state with very positive sentiment towards a subject, and the state will be displayed in green, for example. States with balanced sentiment or insufficient data have values near 50 and are displayed in yellow (for example) hues.

The present invention thus provides a search engine that can search a topic throughout various social media, such as blogs, tweets, and the like, in additional to more conventional websites, and present the results in a user friendly format, such as a magazine, newsletter, scrapbooks, photo album, or newspaper. Various modifications and alternatives will occur to those skilled in the art upon reviewing the present specification. It is intended that all such modifications be included within the scope and spirit of the present invention, as defined by the following claims.

The invention claimed is:

1. A method for identifying trends on social media, blogs, blogging website, news, e-commerce, and other websites, comprising:
receiving a specified search topic from a user's personal computer, laptop, tablet, smartphone, or other computing device or terminal;
searching for the specified search topic one or more social media networks, news, blogs or blogging websites, e-commerce or other websites, to identify messages posted to the one or more social media or other websites related to the specified topic;
receiving a selection of one or more attributes potentially associated with each of the identified messages from the remote computer;
classifying each of the identified messages according to the one or more selected attributes;
generating a visual representation indicating a quantity of the identified messages classified according to the one or more selected attributes;
providing the visual representation to a remote computer;
analyzing of each of the identified messages to determine whether there exists a favorable attitude, a neutral attitude, or an unfavorable attitude toward the specified topic;
wherein results of the analyzing step are correlated by preference;
calculating a subjectivity index indicating what proportion of the identified messages represent a favorable or an unfavorable attitude toward the specified topic, as compared to a total number of the identified messages;
wherein the subjectivity index, I, is calculated according to an equation comprising:

$$I=(\text{Total Favorable}+\text{Total Negative})/(\text{Total Favorable}+\text{Total Negative}+\text{Total Neutral}),$$

wherein:
Total Favorable includes a quantity of the identified messages indicating the favorable attitude toward the specified topic;
Total Unfavorable includes a quantity of the identified messages indicating the unfavorable attitude toward the specified topic; and
Total Neutral includes a quantity of the identified messages indicating the neutral attitude toward the specified topic.

2. The method of claim 1, wherein the one or more selected attributes includes a time at which each of the identified messages was posted.

3. The method of claim 2, wherein the visual representation includes a graph indicating a number of the identified messages that were posted during each of a number of time periods.

4. The method of claim 1, wherein the selection of the one or more attributes enables a further selection as to a range of times at which each of the identified messages was posted.

5. The method of claim 1, wherein the one or more selected attributes includes a geolocation from which each of the identified messages was posted.

6. The method of claim 5, wherein the visual representation includes a map or a graph indicating a quantity of the identified messages that were posted from each of a plurality of geolocations.

7. The method of claim 5, wherein the geolocation includes a local community, a municipality, a state, a province, a region, a nation, or a continent.

8. The method of claim 1, further comprising including the subjectivity index in the visual representation.

9. The method of claim 1, wherein the one or more attributes include a future time, a future date, or one of a plurality of terms indicating a subsequent time.

10. The method of claim 1, further comprising semantically analyzing the content of the identified messages by identifying words most frequently included in the identified messages other than articles, prepositions, and conjunctions, and preparing a list thereof.

11. The method claim 10, further comprising sorting words included in the list of words most frequently included in tile identified messages according to their parts of speech.

12. The method of claim 11, further comprising creating a visual representation of the quantity of the words apportioned by a pre-determined ratio of the parts of speech represented in the list of words most frequently included in the list of identified messages.

13. The method of claim 1, wherein the quantity of the identified messages classified according to the one or more selected attributes is expressed as a total, a fraction, or a percentage.

14. The method of claim 1, wherein the visual representation includes a table, a map, a histogram, a bar graph, a line graph, or a pie chart.

15. The method of claim 14, further comprising electing of a desired type of visual representation from the remote computer.

16. The method of claim 1, further comprising causing an advertisement to be provided to the remote computer based on the specified topic.

17. The method of claim 16, wherein the advertisement is topically related to the specified topic.

18. The method of claim 16, wherein an advertiser selects topics with which to associate.

19. The method of claim 1, further comprising causing an advertisement to be provided to the remote computer based upon information accessible about a user of the remote computer or other computing device.

20. The method of claim 1, further comprising eliciting remuneration from a user of the remote computer or other computing device.

21. A computer system to measure or identify trends on social media, blogs, blogging websites, news, e-commerce, or other websites, comprising:
   a computer system in communication with an Internet enabling communication with server computers hosting one or more social media networks or other networks and a remote computer:
   the computer system comprising at least one processor a memory, and at least one program stored in memory and comprising instructions for:
   receiving specification of a topic from the remote personal computer, laptop, tablet, smartphone, or other computing device;
   for the specified topic, searching the one or more social media networks to identify messages posted to the one or more social media or other networks or websites related to the specified topic;
   receiving a selection of one or more attributes potentially associated with each of the identified messages from the remote computer;
   automatically classifying each of the identified messages according to the one or more selected attributes;
   generating a visual representation indicating a quantity of the identified messages classified according to the one or more selected attributes;
   causing the visual representation to be provided to the remote computer;
   analyzing each of the identified messages to determine where there exists a sentiment indicating one of a favorable, neutral, or unfavorable attitude toward the specified topic;
   calculating a subjectivity index indicating what proportion of the identified messages represent either the favorable attitude toward the specified topic or the unfavorable attitude toward the specified topic as compared to a total number of the identified messages;
   wherein the subjectivity index, I, is calculated according to an equation including:

$$I=(\text{Total Favorable}+\text{Total Negative})/(\text{Total Favorable}+\text{Total Negative}+\text{Total Neutral}),$$

wherein:
   Total Favorable includes a quantity of the identified messages indicating the favorable attitude toward the specified topic;
   Total Unfavorable includes a quantity of the identified messages indicating the unfavorable attitude toward the specified topic; and
   Total Neutral includes a quantity of the identified messages indicating the neutral attitude toward the specified topic.

22. The computer system of claim 21, wherein the one or more selected attributes includes a time at which each of the identified messages was posted.

23. The computer system of claim 21, wherein the one or more selected attributes includes a geolocation from which each of the identified messages was posted.

24. The computer system of claim 23, further comprising eliciting remuneration from a user of the remote computer.

25. The computer system of claim 23, wherein the advertisement is selectively displayed when predetermined levels of virality, popularity, and/or polarity are reached for a specific topic.

26. The computer system of claim 23, wherein the user can earn loyalty points or credits by using the system.

27. The computer system of claim 21, further comprising including the subjectivity index in the visual representation.

28. The computer-implemented method of claim 27, wherein the one or more attributes include a future time and wherein the future time includes at least one of a future time, a future date, or one of a plurality of terms indicating a subsequent time.

29. The computer system of claim 28, wherein the plurality of terms indicating a subsequent time include one or more of soon, later, tonight, tomorrow, next week, next month, mad next year, or specific dates, points, or ranges of time.

30. The computer system of claim 29, further comprising analyzing the content of the identified messages to identify a list of words most frequently included in the identified messages while omitting common connection words.

31. The computer system of claim 30, further comprising classifying words included in the list of words most frequently included in the identified messages according to parts of speech represented by the words included in the list of words most frequently included in the identified messages.

32. The computer of claim 31, further comprising determining a quantity of each of the parts of speech represented in the list of words most frequently included in the list of identified messages.

33. The computer-implemented system of claim 21, wherein the quantity of the identified messages classified according to the one or more selected attributes is expressed as a total, a fraction, or a percentage, and the visual representation includes one of a table, a map, a histogram, a bar graph, a line graph, and pie chart.

34. The computer system of claim 21, further comprising causing an advertisement to be provided to the remote computer based on the specified topic, and is topically related thereto.

35. The computer system of claim 34, wherein an advertiser chooses the specified topic in which to associate an advertisement.

\* \* \* \* \*